INVENTORS
D. E. BERGER
C. W. MERTZ
BY Hudson & Young
ATTORNEYS

INVENTORS
D. E. BERGER
C. W. MERTZ
BY Hudson + Young
ATTORNEYS

May 23, 1961 D. E. BERGER ET AL 2,984,988
GAS ANALYSIS AND CONTROL
Filed March 5, 1956 3 Sheets-Sheet 3

INVENTORS
D. E. BERGER
C. W. MERTZ
BY Hudson & Young
ATTORNEYS

United States Patent Office 2,984,988
Patented May 23, 1961

2,984,988
GAS ANALYSIS AND CONTROL

Donald E. Berger and Clyde W. Mertz, Bartlesville, Okla., assignors to Phillips Petroleum Company, a corporation of Delaware Filed Mar. 5, 1956, Ser. No. 569,553
16 Claims. (Cl. 62—24)

This invention relates to a method of and apparatus for analyzing gaseous mixtures to determine the concentration of particular constituents. In another aspect it relates to control procedures based upon such analyses.

In various systems employed to separate light fractions of natural gasoline and cracked gases it is desirable to measure the concentration of ethane. However, it is extremely difficult to measure ethane in small concentrations in the presence of certain other hydrocarbon gases and liquids. Infrared analysis is not practical because ethane absorption is weak when ethane is present in small concentrations and such absorption occurs at substantially the same wave lengths as are absorbed by certain other hydrocarbons such as propane and propylene. Ultraviolet analysis cannot be employed because ethane does not absorb radiation in the ultraviolet spectrum. Analysis by a mass spectrometer is not practical because of other light hydrocarbons have ionization patterns similar to that of ethane. At the present time, no reliable continuous analyzer is known which is capable of detecting small concentrations of ethane in gaseous hydrocarbon mixtures.

In accordance with the present invention it has been discovered that hydrogen sulfide has a volatility, when present in light fractions of natural gasoline and cracked gases, which closely approximates the volatility of ethane. Hydrogen sulfide normally is present in small concentrations in such mixtures and can be detected much more readily than can ethane. For example, hydrogen sulfide absorbs radiation in the ultraviolet spectrum (2000–3000 A.) whereas other light hydrocarbons, except butadiene and certain substituted acetylenes, do not absorb. Thus, by measuring the concentration of hydrogen sulfide in a hydrocarbon gaseous mixture, information is provided which is representative of the ethane in the mixture. Actually, the measure concentration of hydrogen sulfide is representative of the total concentration of ethane and ethylene. It is to be understood that reference to ethane hereinafter is intended to include ethylene. The present invention is directed primarily toward providing such an analysis and procedures for the control of a gaseous separation system based upon such an analysis.

Accordingly, it is an object of this invention to provide a method of and apparatus for determining the concentration of ethane in a gaseous mixture separation system by a measurement of the hydrogen sulfide concentration at a selected point in the system.

Another object is to provide systems for controlling gaseous mixture separation operations based upon an analysis of the hydrogen sulfide content of the mixture being separated.

Other objects, advantages and features of the invention should become apparent from the following detailed description, taken in conjunction with the accompanying drawings, in which.

Figure 1:
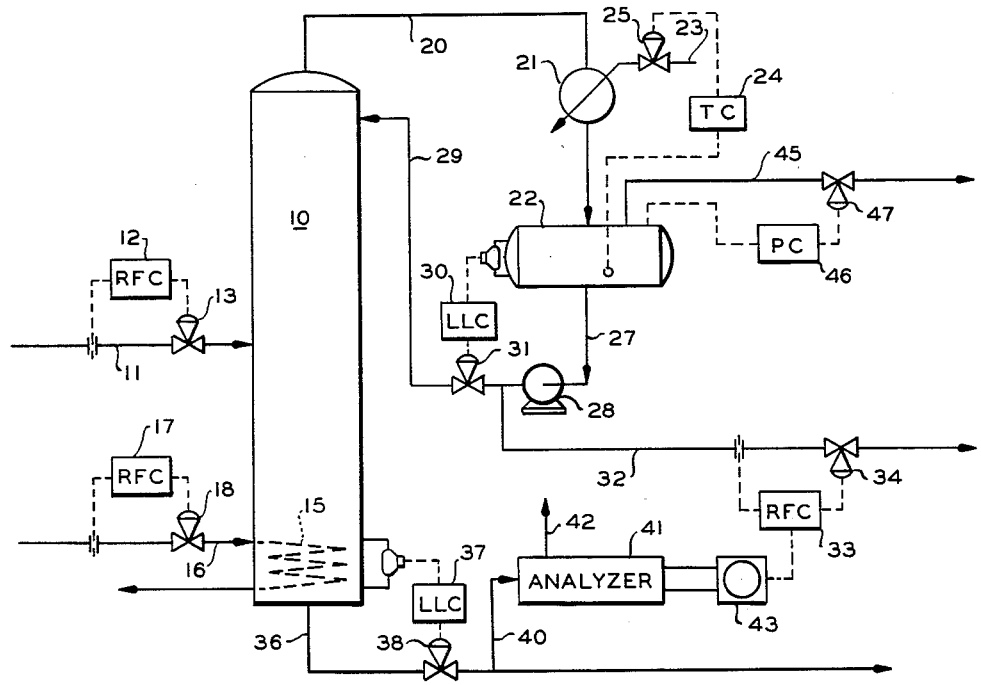
Figure 1 is a schematic representation of a first embodiment of the analysis and control system of this invention.

Referring now to the drawing in detail and to Figure 1 in particular, there is shown a gas separation system which is adapted to provide propane for use as liquefied petroleum gas which is substantially free of gases lighter than propane. For example, if the ethane content of the propane exceeds approximately 5 percent, the volatility of the product is excessive. If the feed mixture contains hydrogen sulfide, apparatus must be provided for the subsequent removal of this gas from the propane product. The capacity of such removal equipment often is a limiting factor to the amount of hydrogen sulfide which can be allowed to remain in the propane. The illustrated control system solves both of these problems.

A feed mixture containing propane and lighter gases is supplied to a fractionation column 10 through a conduit 11 at a predetermined rate which is maintained by a rate of flow controller 12 that adjusts a valve 13. The feedstream is separated in column 10 into an overhead product which contains a major portion of the gases lighter than propane. The kettle product is substantially free of these lighter gases. Heat is supplied to the lower region of column 10 by passing a heating medium, such as steam through a coil 15 which is disposed in the column. This heating medium is directed through a conduit 16 at a predetermined rate which is maintained by a flow controller 17 which adjusts a valve 18. Gases are removed from the top of column 10 through a conduit 20 which passes through a heat exchanger 21 to an accumulator 22. Refrigerant is supplied to exchanger 21 through a conduit 23. A temperature controller 24 adjusts a valve 25 in conduit 23 in response to the temperature in accumulator 22 so a substantially constant temperature is maintained in the accumulator. Liquid is withdrawn from the bottom of accumulator 22 through a conduit 27 which communicates with the inlet of a pump 28. A portion of the fluid discharged from pump 28 is returned to column 10 as reflux through a conduit 29. The amount of reflux is adjusted in accordance with the liquid level in accumulator 22 by means of a controller 30 which adjusts a valve 31 in conduit 29. The remainder of the liquid discharged from pump 28 is removed as the overhead product through a conduit 32. The flow through conduit 32 normally is maintained at a predetermined rate by a flow controller 33 which adjusts a valve 34. A gaseous product is removed from accumulator 22 through a conduit 45 at a rate which is regulated by a pressure controller 46 that operates a valve 47.

The liquid kettle product is withdrawn from column 10 through a conduit 36. The rate of withdrawal is regulated by a liquid level controller 37 which adjusts a valve 38 in conduit 36 in response to the liquid level in the bottom of column 10. A sample of the kettle product is withdrawn continuously from conduit 36 through a conduit 40 which communicates with an analyzer 41. The sample is vented from analyzer 41 through a conduit 42. It is generally desired that this sample be supplied as a vapor to analyzer 41. A suitable heater, not shown, can be incorporated in conduit 40 to vaporize the liquid product. Analyzer 41 is adapted to provide an output signal which is representative of the concentration of hydrogen sulfide in the sample stream supplied thereto. This output signal is applied to a recorder-controller 43 which in turn provides a signal that resets controller 33.

As previously mentioned, it is desired that the concentration of ethane and hydrogen sulfide in the kettle product be maintained within predetermined limits. If the concentrations of these two constituents should tend to increase beyond such limits, it is necessary to change the operation of the column so that a greater portion of these constituents is removed with the overhead product. Thus flow controller 33 is reset by controller 43 to open valve 34 a greater amount if the indicated concentration of hydrogen sulfide in the kettle product increases above a selected value. Because of the close relationship between the ethane and hydrogen sulfide volatilities, this ensures that the concentrations of both these constituents in the kettle product are retained within the required limits.

As a specific example of the control system of Figure 1, column 10 is operated at a pressure of approximately 420 pounds per square inch absolute (p.s.i.a.). The temperature at the top of the column is maintained at approximately 40° F. and the temperature at the bottom of the column is maintained at approximately 175° F. The average compositions of the material being separated are as follows (all figures in mol percents):

| Component | Feed (11) | Kettle (36) | Overhead (45) |
|---|---|---|---|
| Methane | 9.10 | 0.00 | 25.08 |
| Ethane | 29.96 | 4.15 | 66.32 |
| Propane | 59.84 | 94.68 | 6.81 |
| Isobutane | 0.39 | 0.76 | 0.04 |
| Normal butane | 0.07 | 0.15 | 0.02 |
| Hydrogen sulfide | 0.64 | 0.26 | 1.41 |
| Carbon dioxide | | | 0.32 |

In general, it is desired to maintain the ethane content of the kettle product less than about 4 so that the volatility is not excessive. The control system can be adjusted for a particular feed so that a preselected hydrogen sulfide concentration is indicative of this allowable ethane content.

While the control system of Figure 1 has been described in conjunction with adjusting the rate of withdrawal of the overhead product, it should be evident that the column can be controlled in other ways to maintain the desired separation. For example, the output signal from analyzer 41 can be employed to adjust the addition of heating medium to coil 15. If the heat is increased, a greater portion of the liquid in column 10 is vaporized so that increased amounts of hydrogen sulfide and ethane are removed through overhead conduit 32. Furthermore, the output signal from controller 43 can be employed directly to control valve 34 so as to eliminate controller 33. Controller 33 generally is desired as a control system improvement and as a safety feature. Controller 33 can be set so that the flow through conduit 32 is always within selected limits.

Figure 2:
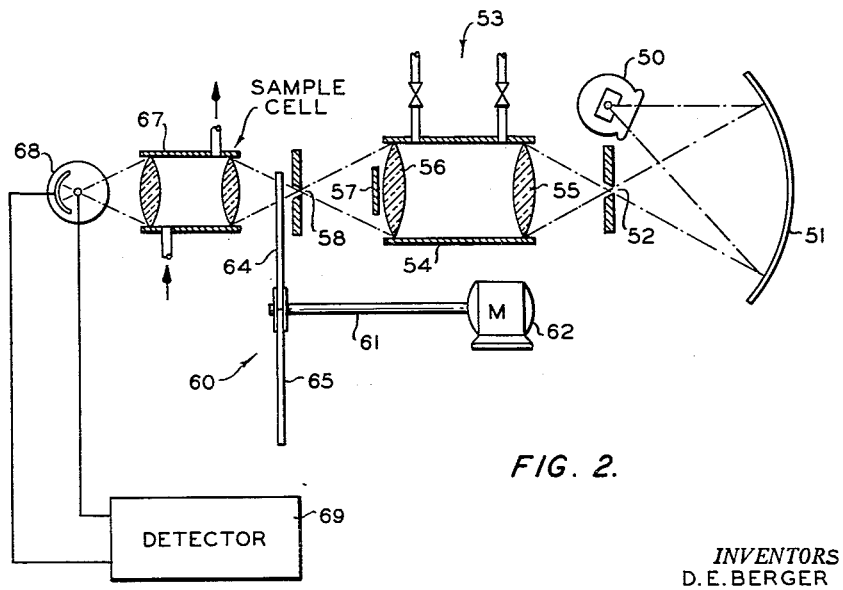
Figure 2 is a schematic representation of a suitable analyzer for use in the system of Figure 1.

In Figure 2 there is shown a schematic representation of an ultraviolet analyzer which is particularly adapted to determine the concentration of hydrogen sulfide in a sample stream. Radiation in the ultraviolet spectrum is provided by a source 50 which can be a hydrogen discharge lamp. Radiation emitted from source 50 is directed by a mirror 51 through an aperture 52 to a focal-isolation monochromator 53. Monochromator 53 comprises a cell 54 having lenses 55 and 56 at the two ends. A circular mask 57 is positioned adjacent lens 56 and an exit aperture 58 is spaced therefrom. Mask 57 blocks the axial rays of radiation which are transmitted through lenses 55 and 56. Because of the chromatic aberration of the lenses, radiation of different wave lengths have different focal points with respect to aperture 58. Thus, mask 57 and aperture 58 block wave lengths longer and shorter than a predetermined value so that only a selected band of wave lengths is transmitted through the assembly. In the analysis of hydrogen sulfide it is desired to adjust the assembly so that wave lengths in the region of approximately 2000 to 2500 Angstrom units are transmitted. The interior of cell 54 can be filled with a filter material such as chlorine gas which has an ultraviolet cutoff at approximately 2750 Angstrom units. This makes the adjustment of the monochromator less critical.

A chopper disc 60 is positioned to rotate in the beam of radiation transmitted through aperture 58. Disc 60 is connected by a shaft 61 to a constant speed motor 62. Disc 60 comprises two sectors 64 and 65 which are constructed of quartz and Vycor, respectively. Vycor is a glass manufactured by Corning Glass Works, Corning, New York, and contains approximately 96 percent silicon dioxide. The ultraviolet transmission properties of Vycor are similar to those of hydrogen sulfide. Quartz is transparent to radiation of wave lengths in the region of interest, whereas hydrogen sulfide and Vycor are partially opaque. Rotation of disc 60 in the radiation beam thus results in a transmitted beam of radiation having an amplitude which varies in substantially the manner of a rectangular wave form. This fluctuating radiation beam is directed through a sample cell 67 which is adapted to receive the sample stream to be analyzed. The beam emerging from cell 67 is directed to a detector 68 which can be a photomultiplier tube. The half cycles of the transmitted beam which pass through the Vycor section of disc 60 do not change in intensity when transmitted through cell 67. However, the half cycles of radiation which pass through the quartz section are diminished in intensity in accordance with the amount of hydrogen sulfide present in cell 67. This difference in intensity is measured to provide an indication of the hydrogen sulfide content of the sample stream. Tube 68 is connected to the input terminals of a detector circuit 69 which provides an electrical voltage representative of the difference in intensity of the two half cycles of radiation impinging upon tube 68. A suitable detector circuit for use in this manner is described in the copending application of M. S. Sparks, Jr., Serial No. 543,733, filed October 31, 1955. This detector circuit comprises a synchronous rectifier. The output signal from detector circuit 69 is applied to controller 43, which can be a conventional instrument to provide a pneumatic pressure corresponding to the amplitude of an electrical input signal. This pressure resets controller 33. Obviously, other forms of telemetering and control equipment can be employed, if desired.

The ultraviolet analyzer illustrated in Figure 2 is particularly well suited to detect hydrogen sulfide. However, the control system of this invention is not limited to any particular type of analyzer or separation. Other well known analyzers which can be employed for this purpose include: mass spectrometers, differential refractometers and color monitors. The latter type of instrument measures the change in color of a selected reagent when contacted by the gas being measured. Separations such as liquid or gas phase contacting of hydrocarbon streams containing $H_2S$ with solution of caustic or one of the ethanolamines may also be controlled.

Figure 3:
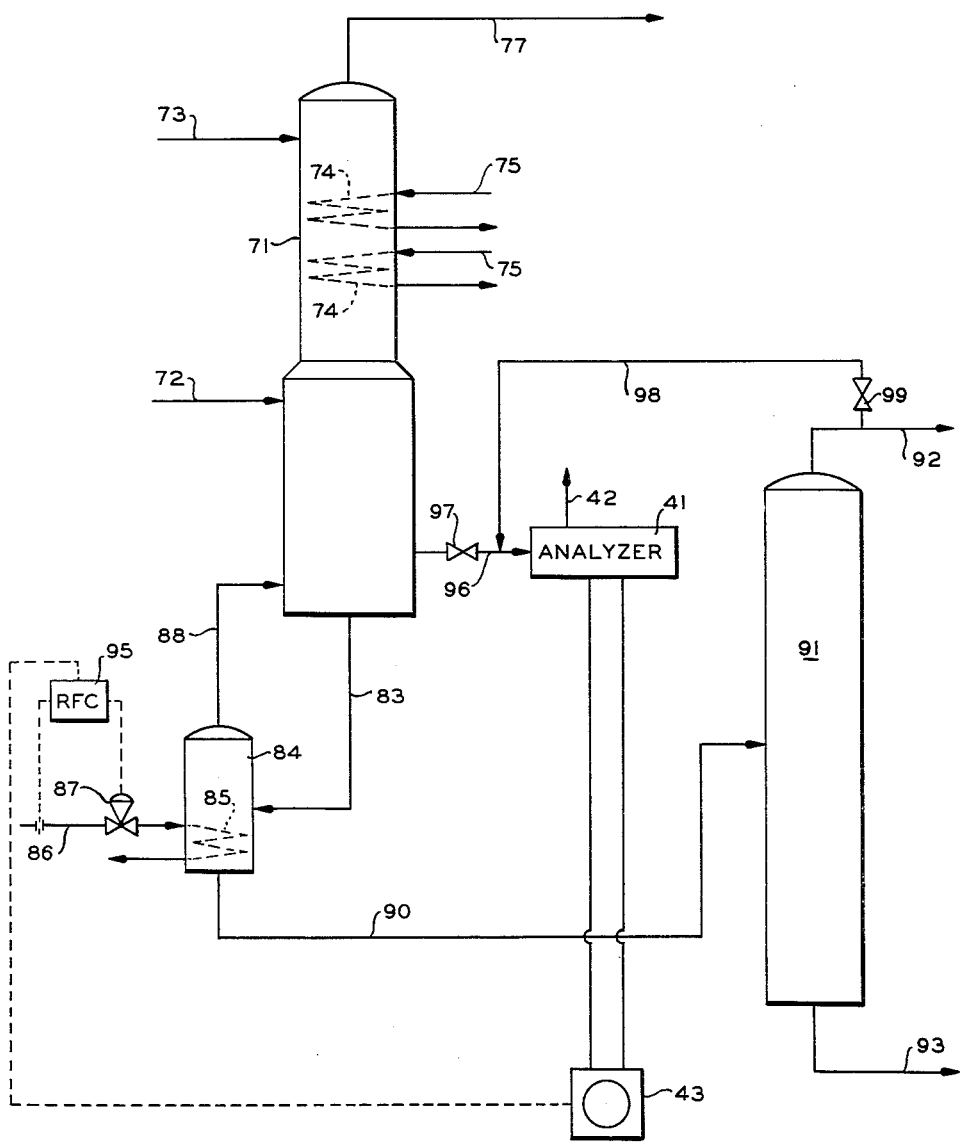
Figure 3 is a schematic representation of a second embodiment of the analysis and control system of this invention.

In Figure 3 there is shown a second embodiment of the analysis and control system of this invention. This system is employed in conjunction with a gas separation system which processes a hydrocarbon feedstream resulting from catalytic cracking of heavier hydrocarbons. Such a feedstream is introduced into an absorption column 71 through a conduit 72. An absorption medium, such as catalytic gasoline, is introduced into the upper portion of column 71 through a conduit 73. The upper portion of column 71 contains coils 74 which have a refrigerant supplied thereto by conduits 75. Gases containing predominantly ethane and lighter constituents are removed from the top of column 71 through a conduit 77.

A liquid rich oil stream comprising ethane, hydrogen sulfide, propylene, propane and heavier constituents is removed from the lower region of column 71 through a conduit 83 which communicates with a reboiler 84. A heating medium, such as steam, is circulated through a coil 85 in reboiler 84 by a conduit 86 which has a valve 87 therein. Vapors from reboiler 84 are returned to column 71 through a conduit 88. Liquid in reboiler 84 is removed through a conduit 90 which communicates with a fractionation column 91 that is operated as a depropanizer. The overhead vapors from column 91 are removed through a conduit 92 and the kettle product is removed through a condiut 93.

The amount of heating medium supplied to reboiler 84 is adjusted by a rate of flow controller 95 which adjusts valve 87 in line 86. In accordance with the present invention, a sample stream is removed in the vapor phase from a tray in the lower region of column 71 through a conduit 96 which communicates with an analyzer 41. Conduit 96 has a valve 97 therein. Analyzer 41 provides an output signal which is applied through controller 43 to reset controller 95. In this manner the heat supplied to column 71 is adjusted in response to the concentration of hydrogen sulfide in the lower region of the column which is in the range of one to five mol percent and is related directly to the percent of hydrogen sulfide in the kettle product. It is desired that the concentration of hydrogen sulfide and ethane in the kettle product be maintained less than a predetermined value because this product is often used as a source of $C_3$ and $C_4$ olefins for alkylation. If the measured concentration of hydrogen sulfide should increase, additional heat is supplied to column 71 to remove more of these gases overhead. Less heat is supplied if the measured concentration decreases.

As a specific example of the control system of Figure 3, column 71 is operated at a pressure of approximately 210 p.s.i.a. The temperature at the top of the column is maintained at approximately 82° F. and the temperature at the bottom of the column is maintained at approximately 230° F. The approximate compositions of the streams are as follows (all figures in mol percent):

| Component | Feed (72) | Solvent (73) | Kettle (90) | Overhead (77) |
| --- | --- | --- | --- | --- |
| Hydrogen sulfide | 1.0 | | 0.07 | 1.6 |
| Carbon dioxide | 1.5 | | | 2.0 |
| Nitrogen and Carbon Monoxide | 7.0 | | | 10.4 |
| Hydrogen | 17.0 | | | 22.0 |
| Methane | 25.0 | | | 31.4 |
| Ethylene | } 24.0 | | 0.05 | 29.0 |
| Ethane | | | | |
| Propylene | } 12.0 | Trace | { 5.6 | 3.0 |
| Propane | | | 2.2 | |
| Butenes | } 9.5 | 4.8 | { 8.6 | 0.6 |
| Butanes | | | 7.4 | |
| $C_5$'s and heavier | 3.0 | 95.2 | 76.03 | Trace |

In general, the ethane and hydrogen sulfide content of the kettle product should be as low as possible. However, economic considerations make it desirable to maintain the hydrogen sulfide content of the kettle product between about 0.03 to 0.15 weight percent which represents an ethane content of about 0.02 to 0.1 weight percent. If these values are lowered, excess propylene and propane is lost overhead.

A second possible sample point for analyzer 41 is conduit 92. A conduit 98, having a valve 99 therein, communicates between conduit 92 and the inlet of analyzer 41. Any hydrogen sulfide removed with the kettle product from column 71 appears in the overhead gases from column 91 so that a measurement at this point also provides a suitable indication of the amount of hydrogen sulfide in the kettle product from column 71. The lower region of column 71 is the preferred sample point, however, because there is less time lag between the analysis and the control step.

It should be evident that other column variables can be adjusted by the output signal of analyzer 41 to maintain the desired operating conditions. For example, the solvent supplied through conduit 73 can be decreased to reduce the amount of hydrogen sulfide removed through the kettle product. The refrigerant supplied to coil 74 can be decreased to produce the same effect.

Figure 4:
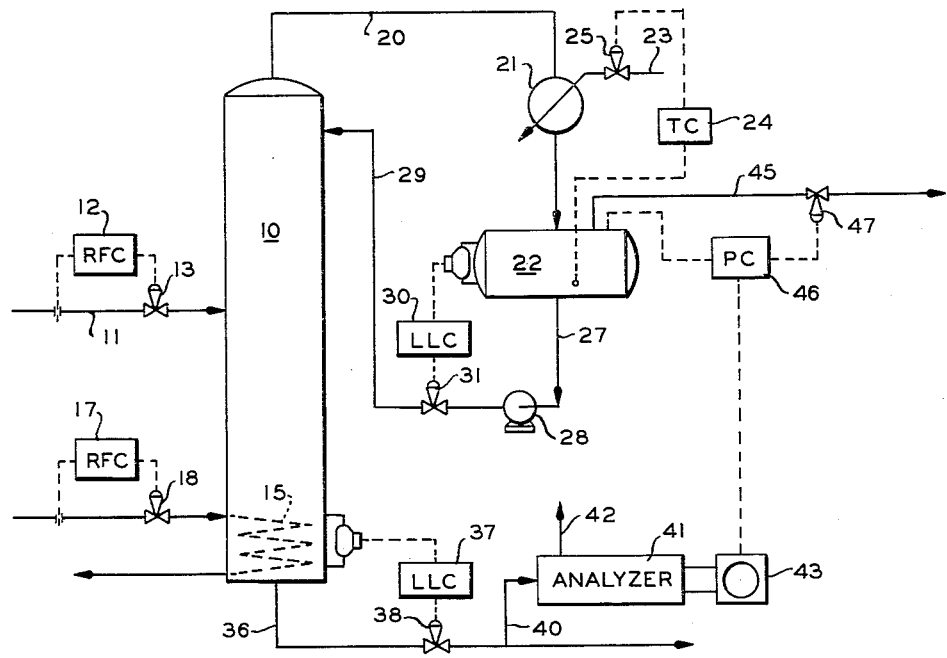
Figure 4 is a schematic representation of a third embodiment of the control system of this invention.

In Figure 4 there is shown a modified form of the control system of Figure 1. This system is identical to that of Figure 1 except that the output signal from analyzer 41 resets pressure controller 46. All of the liquid from accumulator 22 is returned to column 10 as reflux. If the measured hydrogen sulfide should increase above a selected value, valve 47 is opened further to remove more overhead product. Valve 47 is closed further if the measured hydrogen sulfide should decrease below a selected value.

Figure 5:
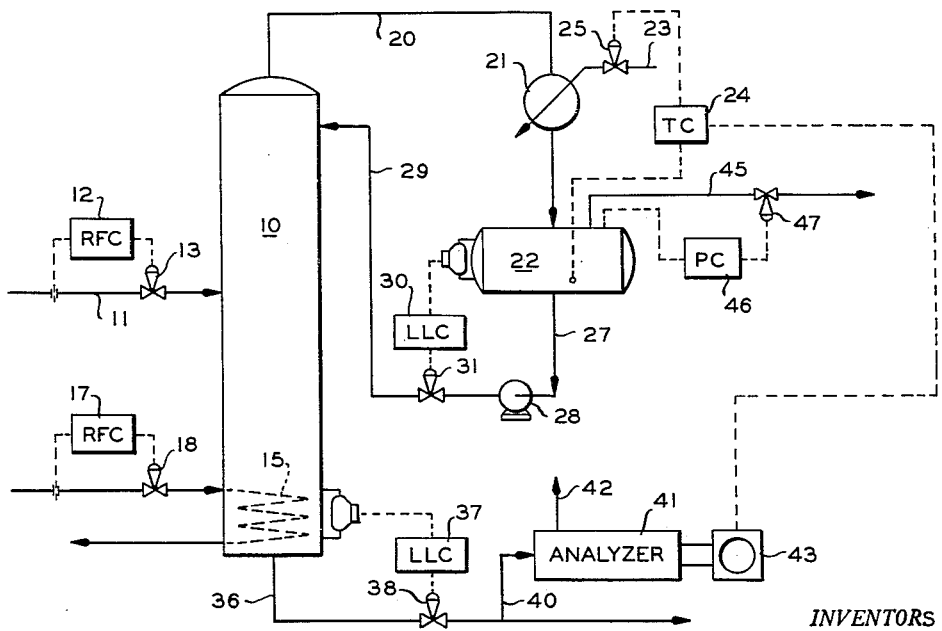
Figure 5 is a schematic representation of a fourth embodiment of the control system of this invention.

The control system of Figure 5 is generally similar to that of Figure 4 except analyzer 41 resets temperature controller 24. If the measured hydrogen sulfide should increase above a selected value, less refrigerant is supplied to the exchanger 21 to condense less of the lighter constituents. Valve 25 is opened further if the measured hydrogen sulfide should decrease below a selected value.

From the foregoing description of present preferred embodiments of this invention it should be evident that there is provided a procedure for analysis and control which is based upon the correlation between the volatilities of ethane and hydrogen sulfide in light hydrocarbon gaseous mixtures. From an analysis of the hydrogen sulfide concentrate at a selected point in the system it is possible to determine the ethane concentration at this point. While the invention has been described in conjunction with present preferred embodiments for purposes of illustration, it should be evident that it is not limited thereto.

What is claimed is:

1. A process for removing a substantial amount of hydrogen sulfide and a hydrocarbon having two carbon atoms per molecule from a fluid mixture containing same and a hydrocarbon having more than two carbon atoms per molecule which comprises passing a fluid mixture containing hydrogen sulfide, a hydrocarbon having two carbon atoms per molecule and a hydrocarbon having more than two carbon atoms per molecule to a separation zone, removing a first product stream from said zone which contains a major amount of constituents other than hydrogen sulfide and hydrocarbons having two carbon atoms per molecule, withdrawing a sample stream from the separation process which has a composition that is representative of the composition of said first stream, measuring the hydrogen sulfide content of said sample stream, by passing a beam of ultraviolet radiation through said sample stream and measuring the radiation absorbed by said sample stream, and controlling the operation of said separation zone in response to said measurement so that the content of hydrogen sulfide in said sample stream remains within selected limits, whereby the concentration of hydrogen sulfide and hydrocarbons having two carabon atoms per molecule in said first stream remains within selected limits.

2. The process in accordance with claim 1 wherein said separation zone comprises a fractionation zone, said first stream is withdrawn from the lower region of said zone, the hydrogen sulfide and hydrocarbon having two carbon atoms per molecule are withdrawn from the upper region of said zone as a second stream, and the operation of said zone is controlled by adjusting the rate of withdrawal of said second stream as a direct function of the measured concentration of hydrogen sulfide.

3. The process in accordance with claim 2 wherein said sample stream is withdrawn from said first stream.

4. The method of determining the concentration of a hydrocarbon having two carbon atoms per molecule in a distillation process wherein such a hydrocarbon and hydrogen sulfide are present in a fluid mixture being separated which also contans a hydrocarbon having more than two carbon atoms per molecule which comprises withdrawing a sample from a region of a distillation process wherein such hydrocarbon concentration is to be measured, and measuring the hydrogen sulfide content of said sample by passing a beam of ultraviolet radiation through said stream and measuring the radiation absorbed by said stream, said hydrogen sulfide content being representative of the concentration of a hydrocarbon having two carbon atoms per molecule in said sample.

5. Apparatus for removing a substantial amount of hydrogen sulfide and a hydrocarbon having two carbon atoms per molecule from a fluid mixture containing same and a hydrocarbon having more than two carbon atoms per molecule comprising a distillation column; means to pass such a fluid mixture to said column; first conduit means communicating with the lower region of said column to remove a first product stream which contains a major amount of constituents other than hydrogen sulfide and hydrocarbons having two carbon atoms per molecule; second conduit means communicating with the upper region of said column to remove a second stream; an analyzer adapted to measure the hydrogen sulfide content of a fluid sample comprising a sample cell, a source of ultraviolet radiation, means to direct radiation from said source through said cell, and means to measure the transmitted radiation; third conduit means communicating between said sample cell and a selected region of the separation system; and means responsive to said means to measure to control the operation of said column to maintain the content of hydrogen sulfide in said third conduit means within selected limits.

6. The combination in accordance with claim 5 wherein said means to control comprises means to adjust the flow through said second conduit means as a direct function of the measured concentration of hydrogen sulfide by said analyzer.

7. The combination in accordance with claim 6 wherein said third conduit means communicates with said first conduit means.

8. Apparatus for removing a substantial amount of hydrogen sulfide and a hydrocarbon having two carbon atoms per molecule from a fluid mixture containing same and a hydrocarbon having more than two carbon atoms per molecule comprising a distillation column, means to heat the lower region of said column, means to pass such a fluid mixture to said column, first conduit means communicating with the lower region of said column to remove a first product stream which contains a major amount of constituents other than hydrogen sulfide and hydrocarbons having two carbon atoms per molecule, second conduit means communicating with the upper region of said column to remove a second stream, an analyzer adapted to measure the hydrogen sulfide content of a fluid sample, third conduit means communicating between the inlet of said analyzer and a selected region of the separation system, and means responsive to the output of said analyzer to adjust said means to heat so that heat is supplied to said column as a direct function of the measured concentration of hydrogen sulfide by said analyzer.

9. The combination in accordance with claim 8 wherein said third conduit means communicates with the lower region of said column.

10. The combination in accordance with claim 8 further comprising a second distillation column having said first conduit means communicating with the feed inlet thereof, and fourth conduit means communicating with the upper region of said second column to remove a product therefrom, said third conduit means communicating with said fourth conduit means.

11. Apparatus for removing a substantial amount of hydrogen sulfide and a hydrocarbon having two carbon atoms per molecule from a fluid mixture containing same and a hydrocarbon having more than two carbon atoms per molecule comprising a distillation column; means to pass such a fluid mixture to said column; first conduit means communicating with the lower region of said column to remove a first product stream which contains a major amount of constituents other than hydrogen sulfide and hydrocarbons having two carbon atoms per molecule; second conduit means communicating with the upper region of said column to remove a second stream; cooling means connected to said second conduit means to cool said second stream; an accumulator communicating with said second conduit means; third conduit means communicating between said accumulator and said column to return liquid to said column as reflux; fourth conduit means communicating with said accumulator to remove gases; an analyzer adapted to measure the hydrogen sulfide content of a sample stream comprising a sample cell, a source of ultraviolet radiation, means to direct radiation from said source through said cell, and means to measure the transmitted radiation; fifth conduit means communicating between said sample cell and said first conduit means; and means responsive to said means to measure to control said cooling means so that the content of hydrogen sulfide in said fifth conduit means remains within selected limits.

12. Apparatus for removing a substantial amount of hydrogen sulfide and a hydrocarbon having two carbon atoms per molecule from a fluid mixture containing same and a hydrocarbon having more than two carbon atoms per molecule comprising a distillation column; means to pass such a fluid mixture to said column; first conduit means communicating with a lower region of said column to remove a first product stream which contains a major amount of constituents other than hydrogen sulfide and hydrocarbons having two carbon atoms per molecule; second conduit means communicating with an upper region of said column to remove a second stream; cooling means connected to said second conduit means to cool said second stream; an accumulator communicating with said second conduit means downstream from said cooling means; third conduit means communicating between said accumulator and said column to return liquid to said column as reflux; fourth conduit means communicating with said accumulator to remove gases; control means responsive to the pressure in said accumulator to regulate flow through said fourth conduit means; an analyzer adapted to measure the hydrogen sulfide content of a sample stream comprising a sample cell, a source of ultraviolet radiation, means to direct radiation from said source through said cell, and means to measure the transmitted radiation; fifth conduit means communicating between said sample cell and said first conduit means; and means responsive to said means to measure to adjust said control means so that the content of hydrogen sulfide in said fifth conduit means remains within selected limits.

13. Apparatus for removing a substantial amount of hydrogen sulfide and a hydrocarbon having two carbon atoms per molecule from a fluid mixture containing same and a hydrocarbon having more than two carbon atoms per molecule comprising a distillation column; means to pass such a fluid mixture to said column; first conduit means communicating with the lower region of said column to remove a first product stream which contains a major amount of constituents other than hydrogen sulfide and hydrocarbons having two carbon atoms per molecule; second conduit means communicating with the upper region of said column to remove a second stream; an analyzer adapted to measure the hydrogen sulfide content of a fluid stream comprising a sample cell, a source of ultraviolet radiation, a focal isolation monochromator, a rotatable member having a first section formed of ultraviolet radiation transparent material and a second section formed of material having ultraviolet absorption characteristics similar to those of hydrogen sulfide, means to pass a beam of radiation from said source through said monochromator and said cell, means to position said sections alternately in said beams, and means to measure amplitude fluctuations of the transmitted beam; third conduit means communicating between said sample cell and a selected region of the separation system; and means responsive to said means to measure to control the operation of said column to maintain the content of hydrogen sulfide in said three conduit means within selected limits.

14. A process for removing a substantial amount of hydrogen sulfide and a hydrocarbon having two carbon atoms per molecule from a fluid mixture containing same and a hydrocarbon having more than two carbon atoms per molecule which comprises passing a fluid mixture containing hydrogen sulfide, a hydrocarbon having two carbon atoms per molecule and a hydrocarbon having more than two carbon atoms per molecule to a separation zone which comprises a reboiled absorption zone, removing a first product stream from the lower region of said zone which contains a major amount of constituents other than hydrogen sulfide and hydrocarbons having two carbon atoms per molecule, removing hydrogen sulfide and hydrocarbons having two carbon atoms per molecule from the upper region of said zone as a second product stream, withdrawing a sample stream from the separation process which has a composition that is representative of the composition of said first stream, measuring the hydrogen sulfide content of said sample stream, and controlling the operation of said separation zone in response to said measurement by adjusting the heat supplied to said zone as a direct function of the measured concentration of hydrogen sulfide so that the content of hydrogen sulfide in said sample stream remains within preselected limits, whereby the concentration of hydrogen sulfide and hydrocarbon having two carbon atoms per molecule in said first stream remains within selected limits.

15. The process in accordance with claim 14 wherein said sample stream is withdrawn from the lower region of said zone.

16. The process in accordance with claim 14 further comprising the steps of passing said first stream to a fractionation zone, and removing a third stream from the upper region of said fractionation zone, said sample stream being withdrawn from said third stream.

References Cited in the file of this patent

UNITED STATES PATENTS

| | | |
|---|---|---|
| 2,443,427 | Kidder | June 15, 1948 |
| 2,475,957 | Gilmore | July 12, 1949 |
| 2,534,657 | Bray | Dec. 19, 1950 |
| 2,553,469 | Pelletterre | May 15, 1951 |
| 2,573,341 | Kniel | Oct. 30, 1951 |
| 2,577,617 | Hudig | Dec. 4, 1951 |
| 2,596,785 | Nelly | May 13, 1952 |
| 2,636,904 | Starr | Apr. 28, 1953 |
| 2,673,297 | Miller | Mar. 23, 1954 |
| 2,690,989 | Bottomberg | Oct. 5, 1954 |
| 2,697,789 | Skarstrom | Dec. 21, 1954 |
| 2,703,844 | Miller | Mar. 8, 1955 |
| 2,721,942 | Friel | Oct. 25, 1955 |
| 2,762,208 | Dennis | Sept. 11, 1956 |
| 2,768,306 | Grubb | Oct. 23, 1956 |
| 2,835,116 | Miller | May 20, 1958 |